United States Patent [19]

Nagata

[11] Patent Number: 4,648,213

[45] Date of Patent: Mar. 10, 1987

[54] COMPACT GRINDER MACHINE

[75] Inventor: Tetsuya Nagata, Narashino, Japan

[73] Assignee: Seiko Seiki Kabushiki Kaisha, Chiba, Japan

[21] Appl. No.: 716,955

[22] Filed: Mar. 28, 1985

[30] Foreign Application Priority Data

Mar. 28, 1984 [JP] Japan .............................. 59-44611[U]

[51] Int. Cl.[4] ............................................. B24B 41/00
[52] U.S. Cl. .................................................. 51/166 R
[58] Field of Search ...................... 51/166 R, 166 MH

[56] References Cited

U.S. PATENT DOCUMENTS 2,176,486 10/1939 Bruestle ............................ 51/166 R
3,382,623 5/1968 Hobler ............................... 51/166 R Primary Examiner—Roscoe V. Parker
Attorney, Agent, or Firm—Robert E. Burns; Emmanuel J. Lobato; Bruce L. Adams

[57] ABSTRACT

A compact grinder machine has an oil-driven mechanical base supported by a frame for processing a workpiece. An oil unit is detachably connected to the mechanical base for supplying pressurized oil to drive the mechanical base, and a cooling unit is disposed adjacent to the oil unit for cooling the oil unit, the oil and cooling unit both being slidably insertable into and withdrawable out of the frame to enable easy repair and maintenance. An oil tank is slidably insertable into and withdrawable out of the frame independently of the oil and cooling units, and the oil tank is detachably connected to the oil unit for supplying oil to the oil unit.

10 Claims, 4 Drawing Figures

COMPACT GRINDER MACHINE

BACKGROUND OF THE INVENTION

This invention relates to a compact grinder machine capable of minimizing floor space.

In a conventional type of compact grinder machine, sequential operations such as a loading and/or unloading of the work, a rapid advance and/or a rapid retraction and a dressing operation, are full-automatically carried out by driving an oil circuit in accordance with an electrical instruction signal. Therefore, notwithstanding that the size of a mechanical base composed of a wheel head table and a head stock table and the like is extremely small-sized, an electric installation box a panel plate and an oil unit become relatively large so that the floor space is apt to become large. In the meanwhile, the electric installation box and/or the panel plate and so on are incorporated compactly into the frame by installing them in an overhang portion from the rear side of the mechanical base.

Furthermore, in the large-sized grinder machine, there is incorporated a pump-motor which is composed of a tank and an oil unit below a column on a bed, but, as mentioned above, in the small-sized grinder machine with an automatic cycle device incorporated with the oil unit, according to the complication of the oil circuit and the troublesome of the maintenance and according to the fact that the frame has therein no means for absorbing vibration of the oil unit and the heat being produced from the oil unit and so on, all of these can not be wholly incorporated within the frame.

SUMMARY OF THE INVENTION

The present invention is intended to incorporate an air-oil unit within the frame without above-mentioned troublesomes and to remove the troublesomes in accordance with the reduction of the floor space.

In order to attain these objects, the compact grinder machine of the present invention is characterized in that a table plate is slidably incorporated within a frame and on the table plate, an oil unit for driving said mechanical base and a cooling unit are respectively disposed via vibration-proof rubber and in addition, on the under surface of the bottom plate of the frame, an oil tank is slidably disposed.

DETAILED DESCRIPTION OF PREFERRED EMBODIMENTS

Figure 1:
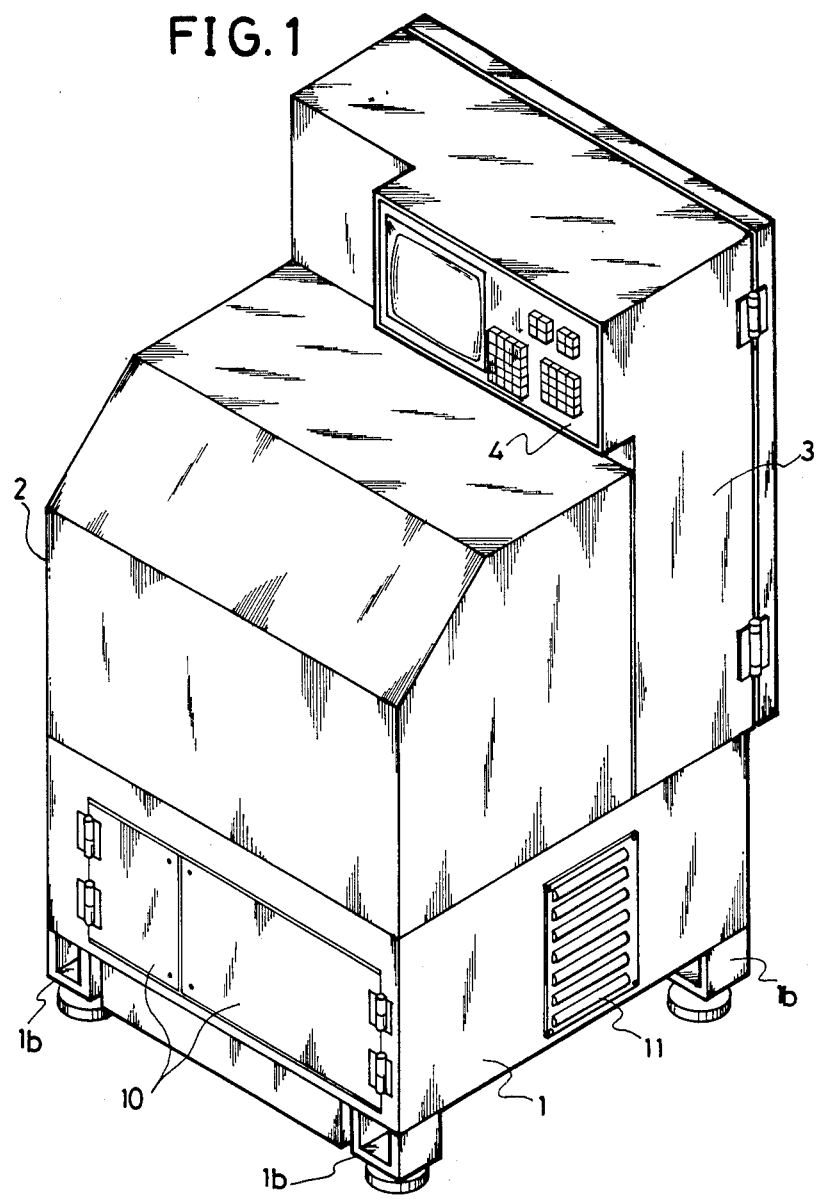
FIG. 1 is a front perspective view showing the whole constitution of an internal grinder machine of the present invention.
Figure 2:
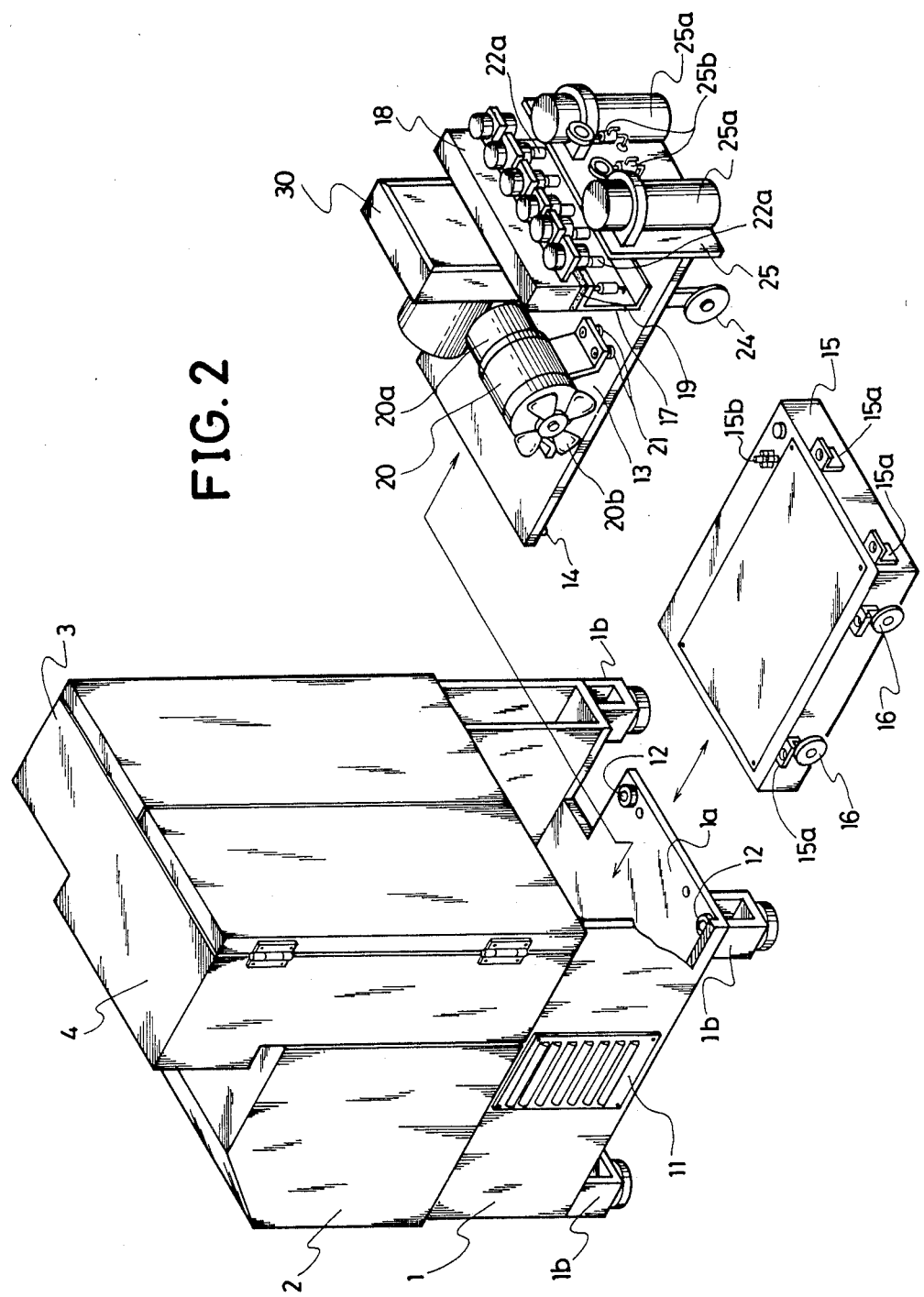
FIG. 2 is a perspective view of the disassembled state of the grinder machine to show the back elevation thereof.
Figure 3:
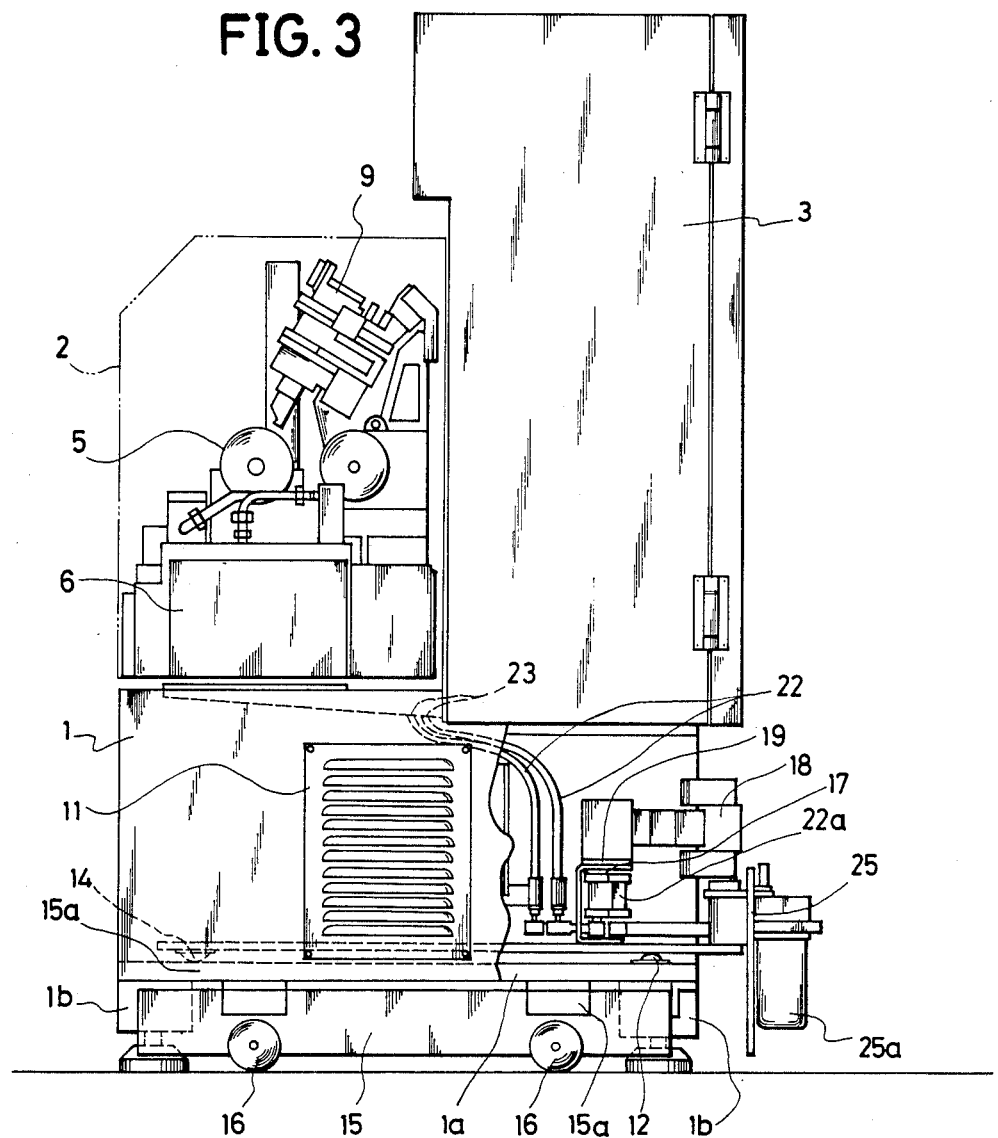
FIG. 3 is a side elevation view thereof.
Figure 4:
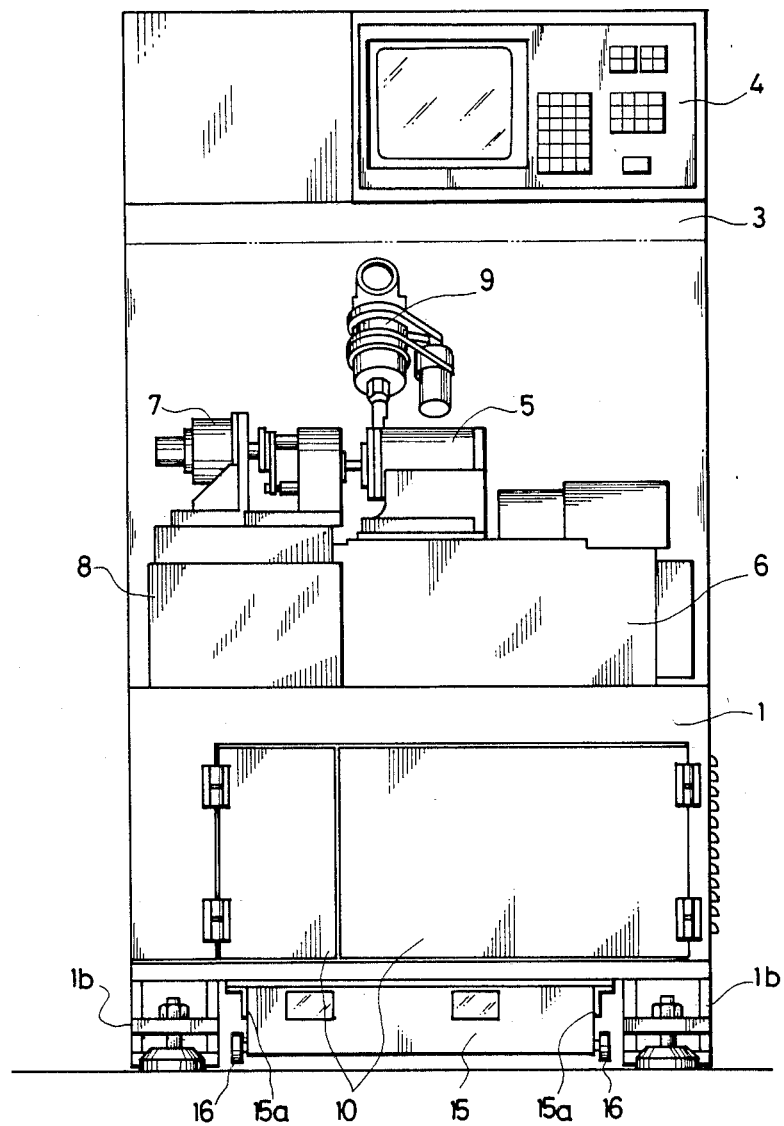
FIG. 4 is a front elevation view thereof.

FIG. 1 to FIG. 4 illustrate a compact grinder machine in accordance with this invention.

This grinder machine is composed of a frame having a hollow space therein, a cover 2 of a mechanical base disposed at on upper front surface of the frame 1, an electric installation box 3 disposed on a rear portion of the frame 1 and a control panel plate 4 which is overhangingly extended from the cover 2 in the vicinity of an upper portion of the electric installation box 3. The mechanical base is composed of a grinder wheel table 6 having a wheel spindle 5, a head stock table 8 provided with a head stock spindle 7 thereon, and a dressing device 9 arranged thereon orthogonally to relative the grinder wheel spindle 7 so that these parts of the mechanical base can successively undergo a work-processing with a certain automation cycle in accordance with a certain instruction and size when a key board on the control panel 4 is operated. The frame 1 is opened at the back and on the front surface thereof, a pair of doors is attached and on the one side thereof, a louvre 11 for charging air is provided. In addition, on an under portion of the frame 1, a bottom plate 1a is integrally provided and four legs 1b are arranged on an under surface of the bottom plate 1a. Further, within the frame 1, a table plate 13 is slidably inserted and within the space being defined by the bottom plate 1a of the frame 1, the leg 1b and a floor surface, an oil tank 15 is slidably inserted.

On the under surface of the front end of the table plate 13, a ball-caster 14 is attached. In turn, on the inner bottom surface of rear end of the bottom plate 1a, a ball-caster 12 is attached. By virtue of these ball-casters 12, 14, the table plate 13 is movable to slide in the frame when the table plate 13 is put on the bottom plate 1a. Moreover, on both sides of the rear end of the plate 13, running wheels 24 in contact with the floor are detachably mounted. The wheels 24 can be mounted after the plate 13 is drawn out a little bit from the frame 1 and the wheels 24 are utilized in case of executing the maintenance for keeping the plate in the drawn state or for transferring the plate to another position. On the plate 13, an oil unit and a cooling unit are arranged.

The oil unit is composed of a filter 25a and a pressure-gauge 25b which are fixed on the rear surface of the supporting plate 25 which is detachably mounted on the rear end of the plate 13; an electromagnetic valve unit 18 mounted via a vibration-proof rubber 19 on a bracket 17 fixed on the plate 13; a motor 20 mounted via a vibration-proof rubber on the plate 13; an oil pump 20a integrally provided at the top end of the motor 20; and an intake fan 20b integrally provided on the rear portion of the motor 20. The intake fan 20b positions just behind the louvre 11 when the plate 13 is completely inserted so that the air can be changed into the frame. The cooling unit is composed of a radiator 30 and its attachment which are orthogonal to the motor 20 and a cooling surface of which positions to the back opening surface of the frame , and the cooling unit is also positioned on the plate 13 via vibration-proof rubber members (not shown). Accordingly, the heat from the oil unit is cooled by virtue of the radiator and is discharged from the back opening of the frame 1. Further, vibration of the oil unit or the cooling unit is decreased by virtue of the vibration-proof rubber members so that no vibration is transmitted to the mechanical base.

Each electromagnetic valve of the electromagnetic valve unit 18 is respectively connected to a pipe opening 23 disposed on the frame 1 via a hose coupling 22a and a hose 22. Therefore, in case of withdrawing the plate from the stored position, the plate is easily disconnected from the frame by detaching the coupling 22a. Moreover, wheels 16 are arranged on both sides of the tank 15 so as to permit the wheels to run on the floor. A set of brackets 15a are provided on the sides of the tank 15 and, by threading a bolt (not shown) into a thread hole of each bottom plate through the hole of each bracket 15a, the tank 15 is secured to the under surface of the bottom plate 1a. When the tank 15 is occasionally withdrawn from the frame 1, if the bolt for fastening the bracket 15a is detached, the tank 15 becomes free and furthermore, if the hose coupling 15b provided on the upper side of the tank 15 is detached, the tank 15 can be freely drawn out. As the compact grinder machine according to the present invention is constituted as set forth above, in a normal operation state of the grinder machine, the table plate of the oil unit and the oil tank are stored within the frame 1 and further, the heat from the oil unit is discharged to the air by virtue of the cooler, and the vibration of the oil unit is not propagated to the mechanical base by virtue of the vibration-proof rubber members. Thus, the mechanical base can be compactly constituted.

Additionally, as the maintenance can be undergone simply by drawing out the table plate or the oil tank in accordance with its necessity, the maintenance and oil-exchanging of the oil driving portion are simplified.

What is claimed is:

1. A compact grinder machine having an oil-driven mechanical base supported by a frame for processing a workpiece, the compact grinder comprising: an oil unit detachably connected to the mechanical base for supplying pressurized oil to drive the mechanical base; a cooling unit disposed adjacent to the oil unit for cooling the oil unit; supporting means slidably insertable into and withdrawable out of the frame and supporting thereon the oil unit and the cooling unit; and an oil tank slidably insertable into and withdrawable out of the frame independently of the supporting means and detachably connected to the oil unit for supplying oil to the oil unit.

2. A compact grinder machine according to claim 1; wherein the supporting means is disposed at the lower part of the frame above the oil tank.

3. A compact grinder machine according to claim 1; wherein the oil tank is supported by wheels to enable the oil tank to be rolled into and out of the frame.

4. A compact grinder machine according to claim 1; wherein the frame has a bottom plate for slidably supporting thereon the supporting means.

5. A compact grinder machine according to claim 4; including ball casters disposed between the bottom plate and the supporting means for enabling sliding movement of the supporting means relative to the bottom plate.

6. A compact grinder machine according to claim 4; wherein the oil tank is slidably disposed under the bottom plate.

7. A compact grinder machine according to claim 6; wherein the oil tank includes wheels for rollably supporting the oil tank.

8. A compact grinder machine according to claim 1; including coupling means for detachably coupling the oil unit to the mechanical base.

9. A compact grinder machine according to claim 1; including coupling means for detachably coupling the oil unit to the oil tank.

10. A compact grinder machine according to claim 1; including vibration-proof rubber members disposed between the oil unit and the supporting means for absorbing vibrations produced by the oil unit.

* * * * *